US009722532B2

(12) United States Patent
Almy et al.

(10) Patent No.: US 9,722,532 B2
(45) Date of Patent: Aug. 1, 2017

(54) PHOTOVOLTAIC MODULE MOUNTING SYSTEM

(71) Applicant: SolarCity Corporation, San Mateo, CA (US)

(72) Inventors: Charles Almy, Berkeley, CA (US); David Molina, San Rafael, CA (US)

(73) Assignee: SOLARCITY CORPORATION, San Mateo, CA (US)

( * ) Notice: Subject to any disclaimer, the term of this patent is extended or adjusted under 35 U.S.C. 154(b) by 0 days.

(21) Appl. No.: 14/823,927

(22) Filed: Aug. 11, 2015

(65) Prior Publication Data

US 2017/0047884 A1 Feb. 16, 2017

(51) Int. Cl.
*H02S 20/23* (2014.01)
*F24J 2/52* (2006.01)
*F16M 13/02* (2006.01)

(52) U.S. Cl.
CPC .......... *H02S 20/23* (2014.12); *F16M 13/022* (2013.01); *F24J 2/5243* (2013.01); *F24J 2/5258* (2013.01)

(58) Field of Classification Search
CPC ......... H02S 20/23; H02S 20/30; F24J 2/5245; F24J 2002/5226; F24J 2/5254; F24J 2/5258; F24J 2002/4669; F24J 2/5228; F24J 2/5252; F24J 2/5266; F16B 5/025; F16B 5/0275; F16B 5/0241
USPC ................ 52/173.3, 710, 711; 136/244, 251; 248/237, 148, 295.11, 205.1, 200; 126/623
See application file for complete search history.

(56) References Cited

U.S. PATENT DOCUMENTS

| 3,998,019 A | 12/1976 | Reinwall, Jr. |
| 6,672,018 B2 * | 1/2004 | Shingleton ............. F24J 2/5205 126/621 |
| 7,797,883 B2 | 9/2010 | Tarbell et al. |
| 8,539,719 B2 * | 9/2013 | McPheeters ........ E04D 13/1476 248/148 |
| 8,567,030 B2 | 10/2013 | Koch et al. |
| 8,631,629 B1 | 1/2014 | Wiener |

(Continued)

FOREIGN PATENT DOCUMENTS

| DE | EP 1321681 A1 * | 6/2003 | .......... F16B 13/0825 |
| DE | 202006006144 U1 | 10/2006 | |

(Continued)

OTHER PUBLICATIONS

International Search Report, dated Dec. 23, 2016, for International Patent Application PCT/US2016/043479, 6 pages.

(Continued)

*Primary Examiner* — Joshua J Michener
*Assistant Examiner* — Matthew Gitlin
(74) *Attorney, Agent, or Firm* — Kilpatrick Townsend & Stockton LLP (57) ABSTRACT

A photovoltaic (PV) module mounting system including a mounting bracket that has a curved mating surface extending as an arch between a pair of flat mounting feet portions. The mounting bracket supports a PV module coupling device. A hanger bolt is provided that has a first threaded portion adapted to engage a roof surface and a second threaded portion for passing through the curved mating surface of the mounting bracket. A threaded knob is adapted to mate with the second threaded portion of the hanger bolt.

20 Claims, 5 Drawing Sheets

(56) References Cited

U.S. PATENT DOCUMENTS

| | | | |
|---|---|---|---|
| 8,733,037 B2 * | 5/2014 | Bindschedler | E04D 11/007 52/126.5 |
| 8,752,338 B2 * | 6/2014 | Schaefer | F24J 2/5245 52/173.3 |
| 8,756,881 B2 | 6/2014 | West et al. | |
| 8,776,456 B1 * | 7/2014 | Schrock | F24J 2/5245 126/623 |
| 8,869,470 B2 | 10/2014 | Lanza | |
| 8,938,932 B1 * | 1/2015 | Wentworth | H02S 20/23 52/173.3 |
| 9,196,755 B2 * | 11/2015 | Wildes | H02S 20/00 |
| 2011/0000519 A1 * | 1/2011 | West | F24J 2/5211 136/244 |
| 2012/0187267 A1 | 7/2012 | Hudson et al. | |
| 2014/0175244 A1 * | 6/2014 | West | F24J 2/5205 248/316.7 |
| 2014/0182662 A1 | 7/2014 | West et al. | |
| 2015/0034355 A1 | 2/2015 | Patton et al. | |
| 2015/0040967 A1 * | 2/2015 | West | F24J 2/5247 136/251 |
| 2015/0155823 A1 | 6/2015 | West et al. | |
| 2015/0168021 A1 * | 6/2015 | Wentworth | H02S 20/23 52/173.3 |
| 2015/0249423 A1 * | 9/2015 | Braunstein | H02S 20/23 52/173.3 |

FOREIGN PATENT DOCUMENTS

| | | | | |
|---|---|---|---|---|
| DE | 20 2006 008867 U1 | 2/2007 | | |
| DE | WO 2012159612 A2 * | 11/2012 | | F16B 5/0275 |
| EP | 2 306 032 B1 | 4/2014 | | |
| JP | 5588227 B2 | 9/2014 | | |
| WO | 2012/116121 A1 | 8/2012 | | |
| WO | 2012/127251 A1 | 9/2012 | | |

OTHER PUBLICATIONS

Written Opinion, dated Dec. 23, 2016, for International Patent Application PCT/US2016/043479, 7 pages.

* cited by examiner

PHOTOVOLTAIC MODULE MOUNTING SYSTEM

BACKGROUND OF THE INVENTION

There are many systems available for mounting photovoltaic (PV) modules to building structures, such as a roof. These systems serve as a rigid interconnection element between a roof and a PV module to hold the modules in place and resist the forces of gravity and wind.

Traditionally, mounting systems consisted of a series of rail structures attached to the roof in columns and/or rows. Module clamps were used to attach the PV modules to these rail structures. Although effective at securing PV modules to the roof, these traditional systems required complex and time-consuming installations and utilized relatively large amount of materials. Eventually, pioneers in the solar industry, such as Jack West of San Rafael-based Zep Solar, realized that module frames themselves are sufficiently rigid to function as the rails of a PV mounting system. By utilizing the inherent rigidity of modules frames, system part counts and the corresponding costs of PV mounting systems were significantly reduced while installation time and overall aesthetics were improved. This realization caused the many in the residential solar industry to move away from rail-based solutions. However, in order to continue the momentum of solar against other fossil fuel-based energy sources, it is imperative that both hard and soft PV costs continue to be reduced.

Most contemporary rail-free or so-called direct mount systems, rely on pillar-like PV module supports which connect to each module frame at various points around the array—typically at least four points on each module. These module supports are in turn attached to the roof, either into a roof rafter or directly to the roof deck, via a flashing. The flashing is simply a flat sheet of rust-resistant metal, such as aluminum, often with one or more preformed features that are designed to mate with the module support. Flashings also typically include at least one lag-bolt through-hole for securing both the flashing and the module support to the roof.

While flashings are effective at preventing water leaks caused by the lag bolt, and also at covering errant drill holes that miss the roof rafter, they can increase the time of installation because when they are used, the installer must complete all site preparation first before placing any of the PV modules, installing a flashing at each intended roof penetration. This bottleneck prevents an installer from installing the array row-by-row or panel-by-panel and, as a result, may slow-down the rate at which PV can be installed, may require larger installation crews, or both. Also, because each flashing gets tucked underneath the next up-roof course of shingles, it is often necessary to remove existing roofing nails to accommodate the flashings. The installer must then be careful to apply sealant to each of these holes to prevent leaks. Therefore, each time an existing roofing nail is removed, a new potential leak point is created. Finally, each flashing adds a material cost to each solar installation that becomes significant when multiplied against every roof penetration of every installed array. This is especially true if the flashing has custom features or rubber parts requiring custom manufacturing.

Another problem with flashing-based mounting systems as well as flashing-less direct mount systems is that the area around an intended point of attachment of a PV mounting bracket may not be flat. This could be caused by the presence of a seam of overlapping shingles at the desired placement point, warping of the roof deck, and/or lack of uniformity in the roof joists or other roof components. As a result, although a lag bolt should generally be drilled normal to the surface of a rafter to provide the greatest pull-out resistance, normal to the roof rafter may not be normal to the portion of the roof surface contacted by the PV mounting bracket.

Accordingly, there is a need for a rail-free PV mounting system that enjoys the benefits of existing rail-free solutions, while reducing costs, and increasing installation times relative to such systems. There is also a need for a rail-free PV mounting system that is capable of compensating for planar variations in a roof surface.

BRIEF SUMMARY OF THE INVENTION

Many embodiments of the invention are directed to a photovoltaic (PV) module mounting system. The system can include a mounting bracket having a first portion arranged to face a roof and a second portion arranged to face a PV array. The first and second portions can be spaced apart from one another and have a curved cross-sectional shape. A pair of flat mounting feet portions can be included on the first portion. A first slot can be formed in the first portion and a second slot can be formed in the second portion. The first slot and second slot can be aligned and the second slot can be larger than the first slot. The system can include a hanger bolt having a first threaded portion adapted to engage a roof surface and a second threaded portion adapted to pass through the first and second slots of the mounting bracket. A washer can be located between the first threaded portion and the second threaded portion for limiting the depth that the first threaded portion can achieve in the roof surface. A threaded knob can be adapted to mate with the second threaded portion of the hanger bolt and to compress the mounting bracket to a roof surface when rotational torque is applied to the threaded knob. The system can also include a PV module coupling device attached to the mounting bracket and adapted to engage the frames of at least two photovoltaic modules while maintaining a space in between them.

In many embodiments, the first portion of the mounting bracket can include a curved outer first portion surface.

In many embodiments, the second portion of the mounting bracket can include a curved outer second portion surface.

In many embodiments, the threaded knob can abut the curved outer second portion surface and extend upwardly past the curved outer first portion surface.

In many embodiments, the hanger bolt can be configured to pass through the first and second slots of the mounting bracket at non-transverse angles with respect to the flat mounting feet portions.

In many embodiments, the threaded knob can mate to the hanger bolt against the curved cross-sectional shape of the second portion of the mounting bracket.

In many embodiments, the threaded knob can be configured to be fully tightened by hand.

In many embodiments, the PV module coupling device can be a rock-it connector.

In many embodiments, the PV module coupling device can be a clamping connector.

Many embodiments of the invention are also related to a PV module mounting system that can include a mounting bracket that can have a curved mating surface extending as an arch between a pair of flat mounting feet portions. The mounting bracket can be configured to hold a PV module coupling device. A hanger bolt can be provided that has a first threaded portion adapted to engage a roof surface and a second threaded portion for passing through the curved mating surface of the mounting bracket. A threaded knob can be adapted to mate with the second threaded portion of the hanger bolt.

In many embodiments, the curved mating surface can include an elongated slot that the second portion of the hanger bolt passes through.

In many embodiments, the hanger bolt can be configured to pass through the mounting bracket at non-transverse angles with respect to the flat mounting feet portions.

In many embodiments, the knob can include a grip portion for tightening the knob only by hand.

In many embodiments, the threaded knob can compress the curved mating surface against a roof surface when rotational torque is applied to the threaded knob.

Many embodiments of the invention are also related to a PV module mounting system having a mounting bracket that can have an elongated and curved mating surface. The mounting bracket can be configured to hold a PV module coupling device. The system can include a hanger bolt adapted to engage a roof surface. A threaded knob can be adapted to mate with the hanger bolt against the mating surface, where the mating surface is shaped to compensate for angular misalignment of the hanger bolt with respect to the mounting bracket.

In many embodiments, the mounting bracket comprises a first arch that defines the mating surface.

In many embodiments, the mounting bracket comprises a second arch displaced above the first arch.

In many embodiments, the hanger bolt can be aligned with the flat mounting feet portions at angles ranging from 80-100 degrees.

In many embodiments, the knob can have an engagement surface configured to partially engage with the mating surface when the hanger bolt is misaligned.

In many embodiments, the threaded knob can be adapted to mate with the hanger bolt without requiring tools.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF THE INVENTION

Embodiments of the invention are generally directed towards a system for mounting a PV module to a support structure such as a roof surface. The system can include a mounting bracket for supporting a PV module over various angles with respect to a hanger bolt. Advantageously, such a system requires little to no tools for installation, and hence installation time is greatly reduced over prior systems that require tools and bolting. Also, because the system allows a mounting bracket to be mounted at a range of angles with respect to a hanger bolt, the system allows for compensation for variations in roof surface. The following description details some examples of such a system.

Figure 1A:
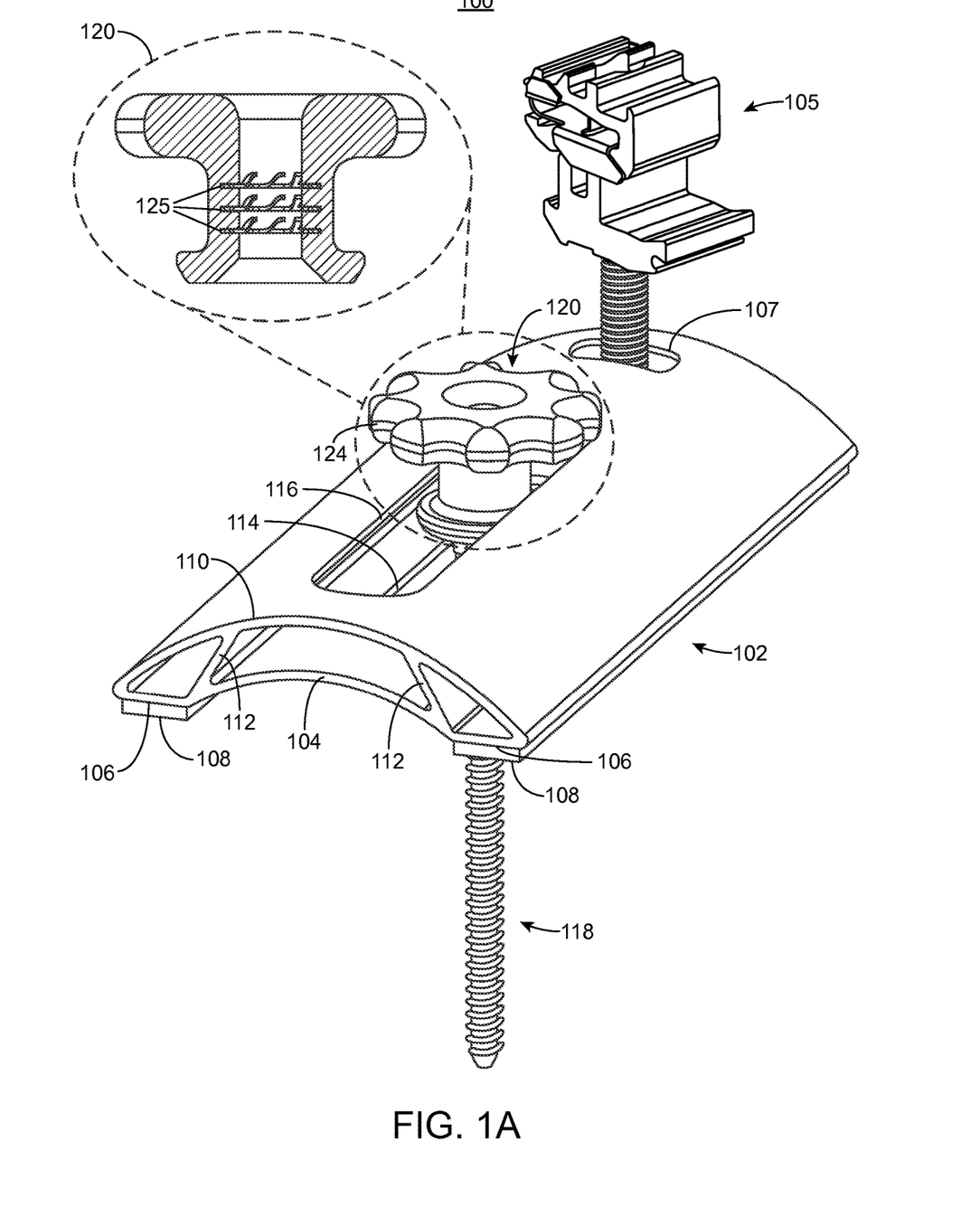
FIGS. 1A and 1B are perspective and side views, respectively, of a photovoltaic module (PV) mounting system, according to an embodiment of the invention.
Figure 1B:
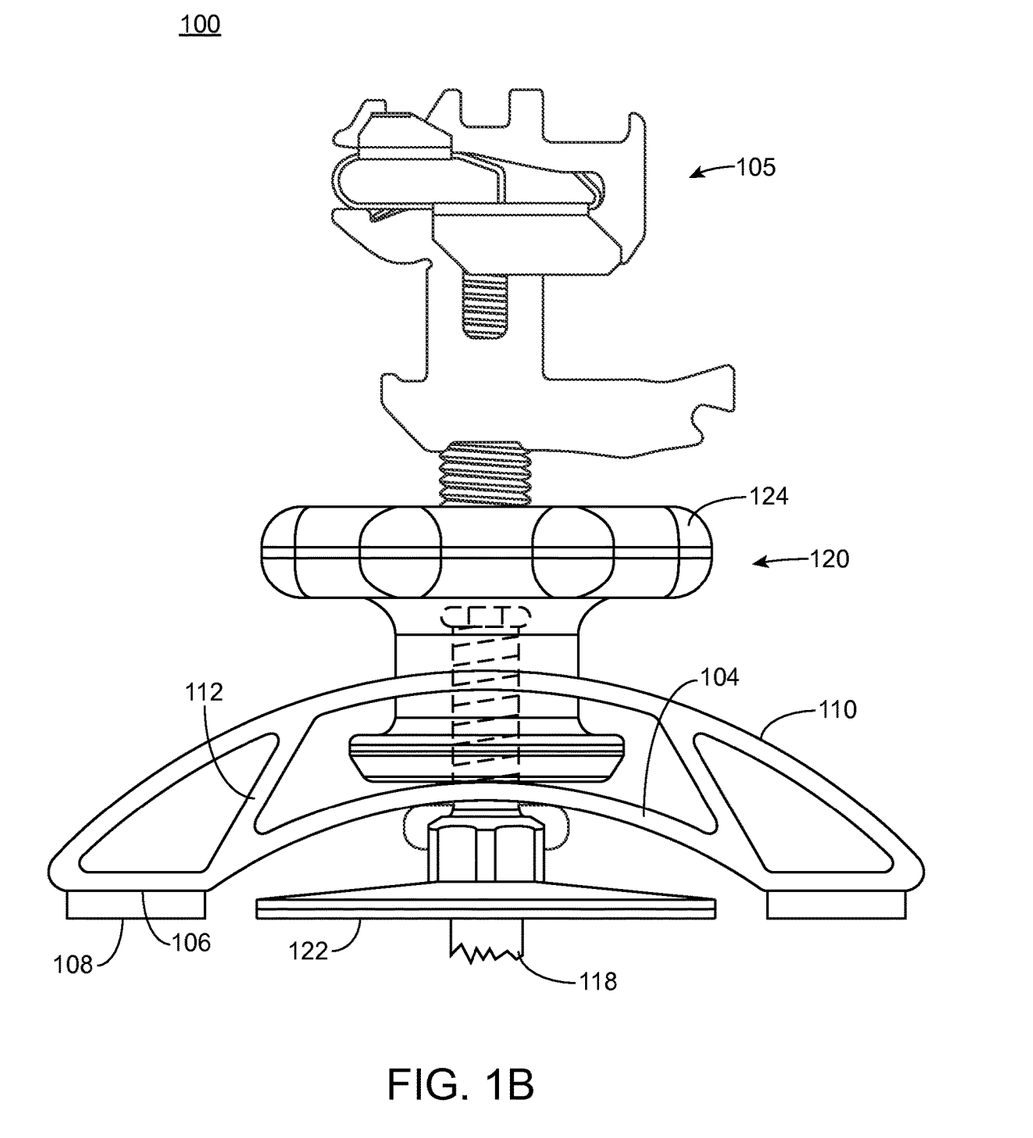

FIGS. 1A and 1B are perspective and side views, respectively, of a photovoltaic module (PV) mounting system 100 according to various embodiments of the invention. System 100 includes arched elongated mounting bracket 102. In various embodiments, elongated mounting bracket 102 may comprise a single extrusion of aluminum or other extruded or forged corrosion resistant material that is sufficiently strong to withstand the forces necessary to support a PV array. As illustrated, arched elongated mounting bracket 102 includes lower portion 104 that arches between two flat mounting feet portions 106 for accommodating mounting feet 108. In some embodiments, the feet portions 106 and mounting feet 108 are spaced 90 mm apart to provide a low profile mounting bracket, however, less or more spacing may be utilized. Arched elongated mounting bracket 102 also includes upper portion 110. Lower portion 104 and upper portion 110 terminate near flat mounting feet portions 106. Although in the Figures, flat mounting feet portions 106 are shown as spanning the entire length of elongated mounting bracket 102, in various embodiments, flat mounting feet portions 106 may span only a portion of the bottom side of elongated mounting bracket 102.

Figure 4:
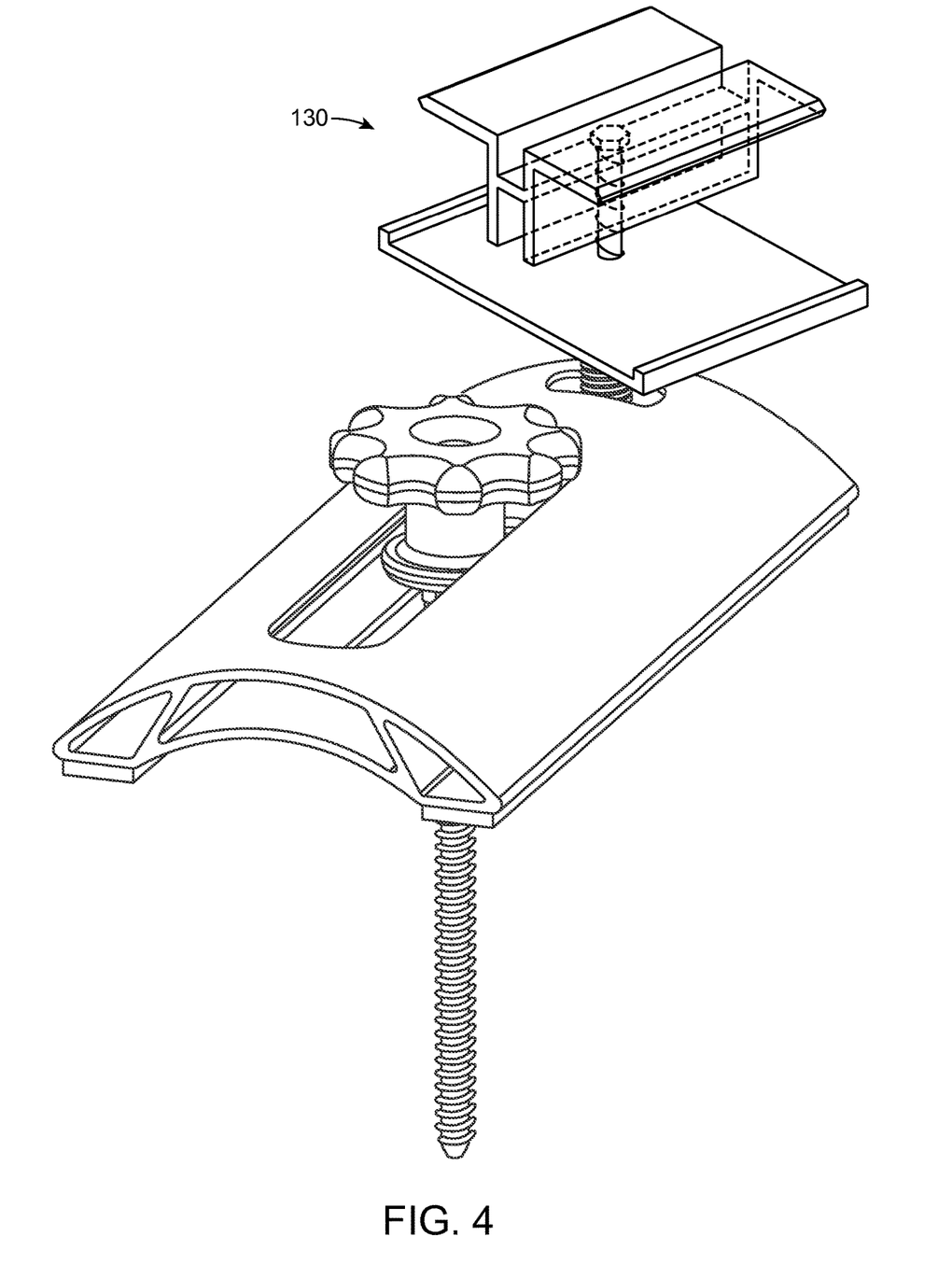
FIG. 4 shows a perspective view of another exemplary PV mounting system, according to an embodiment of the invention.

Elongated mounting bracket 102 supports a PV module coupling device such as device 105 that is configured to couple to the frames of at least two photovoltaic modules while maintaining a space between the modules. The PV module coupling device 105 shown in the FIGS. 1A and 1B is a "rock-it" style connector manufactured by SolarCity Corp., which is arranged to connect to a groove formed in the side of a pair of adjacent PV modules. Such a coupling device is described and illustrated, for example, in commonly assigned U.S. patent application Ser. No. 14/615,320, Publication No. 2015/0155823-A1, the disclosure of which is herein incorporated by reference in its entirety. However, the system 100 is not limited to use of such a coupling device. A multitude of different styles of coupling devices are compatible with the system, such as, for example, coupling device 130 illustrated at FIG. 4, which depicts a clamping-style coupling device 130 with an upper and lower clamp arranged to clamp the top and bottom portions of a PV module. Coupling device 130 may be advantageous in certain situation because it works with standard PV module frames that do not have groove formed in their outer surface.

With continuing reference to FIGS. 1A-1B, curved upper portion 110 spans over curved lower portion 104, each portion being an elongated arch with curved upper and lower surfaces. In addition to terminating near mounting feet portions 106, in various embodiments, upper portion 110 may be interconnected to lower portion 104 via reinforcement ribs 112. While depicted here as being curved, the upper portion 110 can also be shaped as a flat or rectangular section. Lower portion 104 and/or upper portion 110 can also include a slot for articulating the coupling device 105 up to at least 10 degrees in one direction (i.e. exemplary range of 80-100 degrees). In this example, slot 107 is only shown at the upper portion 110, but an additional slot at the lower portion 104 can also be included. In various embodiment, the threaded stud supporting module coupling device 105 may be mounted under slot 107 in upper portion 110 with a tight friction fit so that it may move within slot 107 to move the position and orientation of coupling device 105. This may be accomplished by capturing the base of the threaded stud under the bottom surface of upper portion using a riveted or welded restraining cap.

In addition, lower portion 104 and upper portion 110 respectively include lower and upper slots 114/116 that are aligned and sized to accommodate a hanger bolt such as hanger bolt 118. As is known in the art, a hanger bolt comprises two sets of threads at either end, which in some cases are separated by a fixed washer, stop, and/or unthreaded portion. The lower threaded portion of hanger bolt 118 is used for attachment to a support structure such as roof deck and/or roof rafter, while the upper threaded portion is used for attachment to threaded knob 120. In various embodiments, a depth-limiting washer such as washer 122 is used to limit the penetration depth of hanger bolt 118 into a structure. This will allow an installer to install hanger bolt 118 to the correct depth into a roof or other support structure every time without having to monitor the depth during installation. Also, hanger bolt 118 may include a nut above washer 122 to allow an installer to drive hanger bolt 118 into a roof deck using a deep socket with an impact driver or other power tool. In a preferred embodiment, upper slot 116 is wider than the lower slot 114 to accommodate the width of knob 120 while lower slot 114 fits over the top portion of hanger bolt 118 but acts as a stop against which knob 120 presses when knob 120 is torqued down. Knob 120 may include grip portion 124 for tightening knob 120 by hand, thereby avoiding the need for tools to secure bracket 102 to a support surface. However, in some embodiments a nut can be used in lieu of the knob 120 if desired.

Knob 120 can also include at least one push nut 125. Here, three push nuts 125 are shown, but more or less can be used. Push nuts 125 can be over-molded within knob 120, or attached by conventional means, such as an adhesive. Push nuts 125 allow a user to push down on knob 120, until knob 120 bottoms against lower portion 104, and then turn knob 120 a relatively small degree to preload it against lower portion 104, thereby securing mounting bracket 102 to hanger bolt 118 and against any structure that lag bolt 118 is attached to. While advantageous, knob 120 is not limited to use of push nuts 125 and in other embodiments conventional threads or nuts can be used in lieu of push nuts 125.

In use, the hanger bolt is 118 is first attached to an appropriate structural element, such as a roof deck. In order to maximize the pull strength of hanger bolt 118, it is preferable installed through the roof deck into a roof rafter. Lower slot 114 of bracket 102 is then aligned with hanger bolt 118 and placed in a desired position over hanger bolt 118 so that the free end of hanger bolt 118 passes through slots 114 and 116. Slots 114 and 116 allow movement of elongated mounting bracket 102 along the axis of the slots, as well as 360 degrees radially, as needed to align module coupling device 105 with the frame of at least one PV module. Knob 120 is then hand tightened onto the free end of hanger bolt 118 until a suitable torque is reached to securely compress bracket 102 against the roof.

Figure 2:
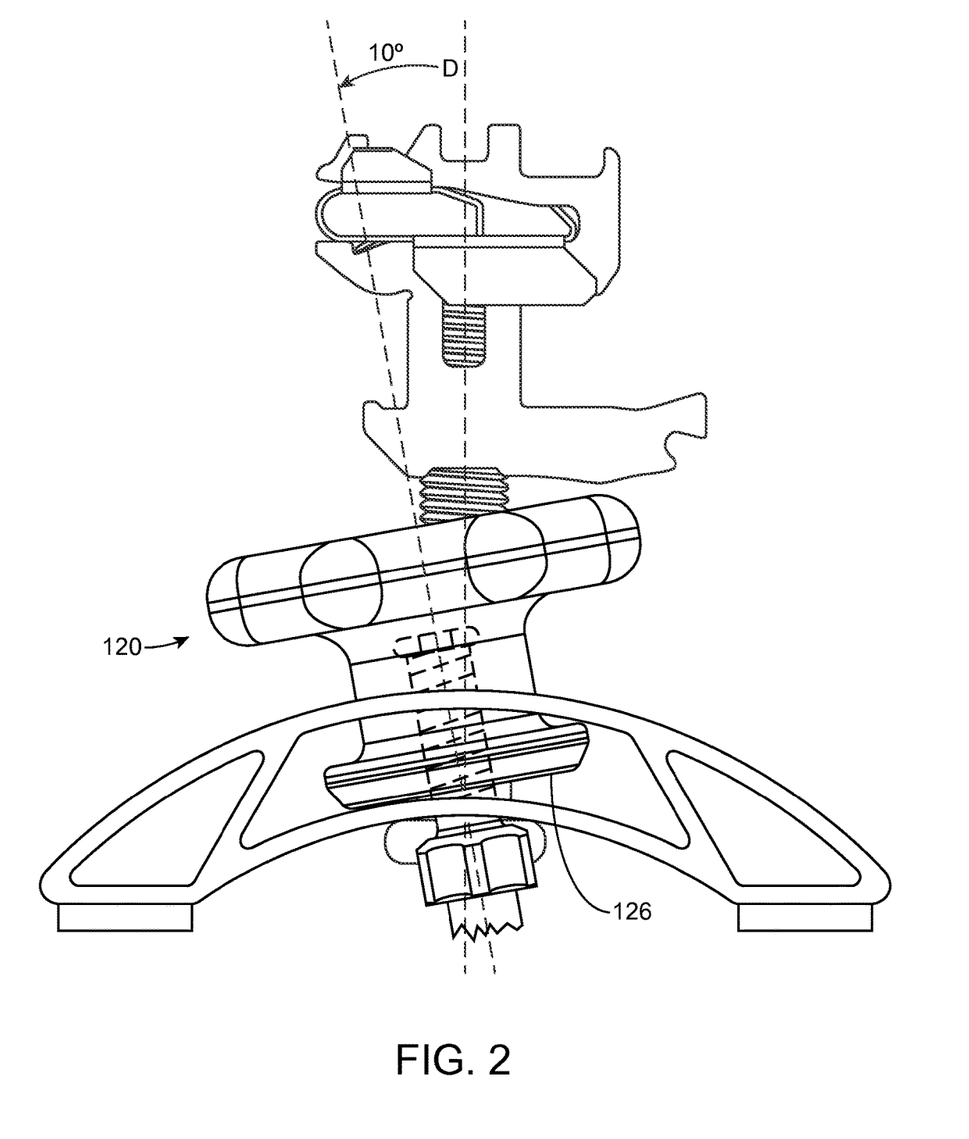
FIG. 2 is a side view of the PV mounting system of FIGS. 1A and 1B in use, according to an embodiment of the invention.

Referring now to FIG. 2, this figure illustrates the ability of mounting system 100 to accommodate variations in roof angle with respect to hanger bolt angle. As discussed above, although roofs appear flat from the ground, any given small area of a roof may not be perfectly for a number of different reasons. Also, when an installer drills a pilot hole and subsequently drives in a hanger bolt, that hanger bolt may not be perfectly normal to (i.e., perpendicular to) the visible roof surface at that point. System 100 compensates for these variations by allowing elongated bracket 102 to be installed parallel to the roof surface, while the top portion of hanger bolt 118 can pass through slots 114/116 at an angle less than 90 degrees with respect to the orientation of bracket 102. The curvature of lower portion 104 and the geometry of knob 120 allows it to effectively restrain base 102 against the roof surface even when the hanger bolt and bracket 102 are not precisely orthogonal. As shown at FIG. 2, curved upper surface of lower portion 104 of bracket 102 allows for knob 120 to seat against lower portion 104 of bracket 102 at an infinitely adjustable number of positions within a range of angles—approximately plus or minus 10 degrees off center in the example of FIG. 2. This flexibility allows leeway to account for uneven roof surfaces and misaligned hanger bolts 118. In some embodiments, this allows hanger bolt 118 to be non-perpendicular with respect to the flat mounting feet portions 106 up to at least 10 degrees in one direction (i.e. exemplary range of 80-100 degrees), yet still be suitable for supporting the bracket 102. Knob 120 includes flat lower engagement surface 126 dimensioned large enough to provide sufficient torque to compress the bracket 102 to the roof deck even when only partially engaging with the lower portion 104.

Figure 3:
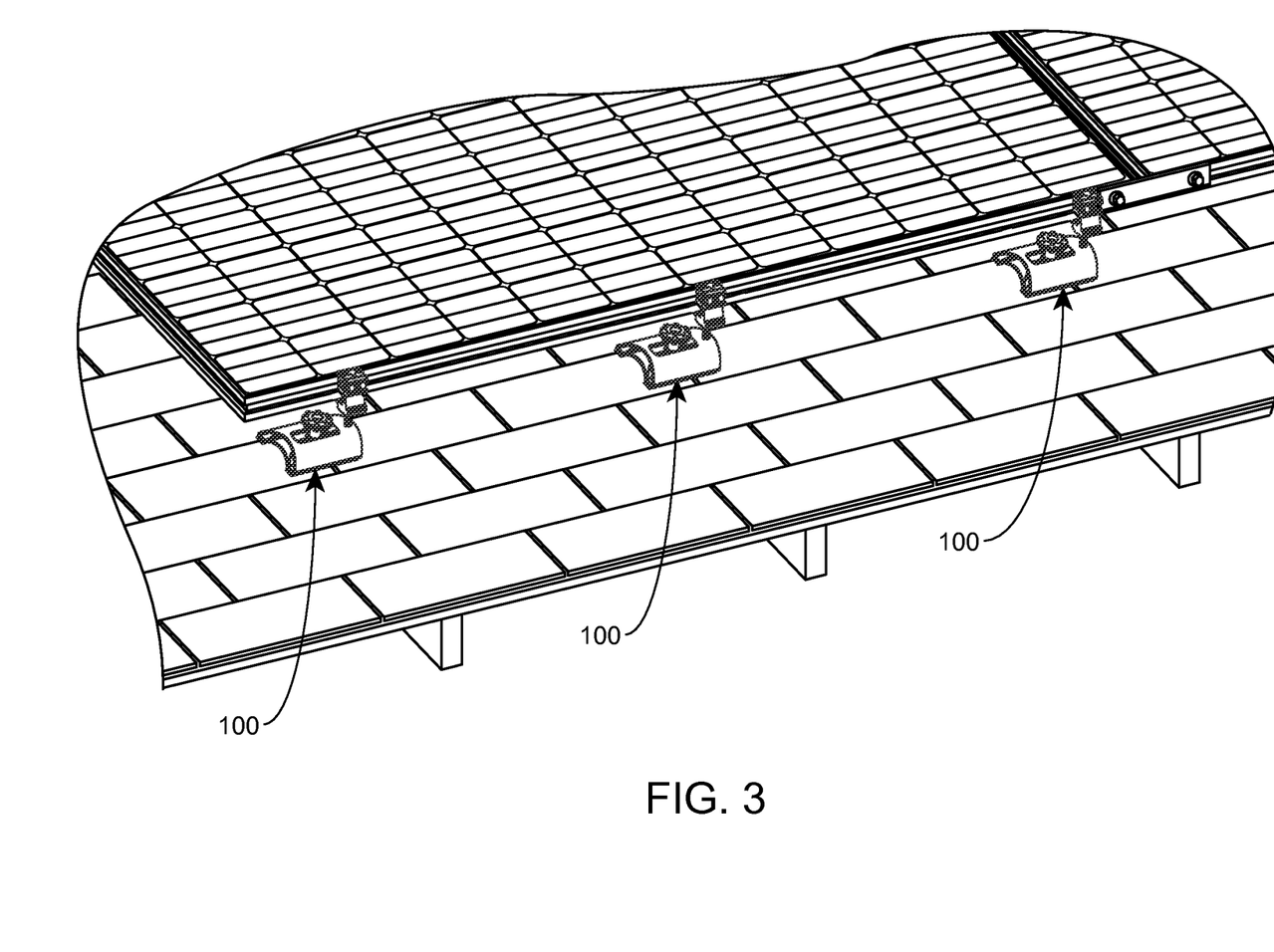
FIG. 3 is a perspective a plurality of PV mounting systems, according to an embodiment of the invention.

FIG. 3 shows a plurality of systems 100 mounted to a roof and supporting an array of PV modules. While the system 100 is shown mounted to a sloped roof, the system 100 can be used on a variety of structures such as flat roofs or ground mounted systems. Moreover, although the roof shown in FIG. 3 is a composition shingle roof, the mounting system 100 according to the various embodiments may be used with a flat tile, shake, or other types of roof. Furthermore, by way of example, three mounting systems 100 are shown supporting one side of a single PV module. In various embodiments, fewer or more systems 100 may be used to support one side of a PV module.

Using the system 100 according to the various embodiments of the invention, the overall installation process is greatly simplified. An installer will typically begin an installation by snapping a chalk line at the base of the roof to establish a reference point. Using system 100, the installer will first drill a pilot hole for each desired connector 102 at approximate location where that connector will support a photovoltaic module along the chalk line. The installer will follow each pilot hole with hanger bolt 118, torqueing it down with an impact driver or other power tool until washer 122 engages the roof surface. For the first row, the installer may place one connector 102 over each installed hanger bolt 118 and hand-tighten the connector 102 to the roof with knob 120. Then, after all systems 100 have been installed for a given row, he or she may drop in a row of PV modules, pivot locking them into coupling device 105. For subsequent rows, the installer may complete the entire process for each system as he or she installs the array, drilling, driving, coupling, and attaching. After a hanger bolt has been driven into the roof, the installer may attach the coupling device frame to up-roof frame of the previously dropped module and then pivot that assembly down over the projecting portion of the hanger bolt before twisting down knob 120 to lock it into place. It should also be appreciated that the hanger bolt and twist knob corresponding to the various embodiments of the invention illustrated and discussed herein could be used with a variety of different photovoltaic mounting systems.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A photovoltaic (PV) module mounting system comprising:
    a mounting bracket having a first portion arranged to face a roof and a second portion arranged to face a PV array, wherein the first and second portions are spaced apart from one another and have a curved cross-sectional shape;
    a pair of flat mounting feet portions on the first portion;
    a first slot formed in the first portion and a second slot formed in the second portion, wherein the first slot and second slot are aligned and the second slot is larger than the first slot;
    a hanger bolt comprising a first threaded portion adapted to engage a roof surface, a second threaded portion adapted to pass through the first and second slots of the mounting bracket, and a washer located between the first threaded portion and the second threaded portion for limiting a depth that the first threaded portion can achieve in the roof surface;
    a threaded knob adapted to mate with the second threaded portion of the hanger bolt and to compress the mounting bracket against a roof surface when rotational torque is applied to the threaded knob; and
    a PV module coupling device attached to the mounting bracket and adapted to engage frames of and maintain a space between at least two photovoltaic modules.

2. The system of claim 1, wherein the first portion of the mounting bracket comprises a first curved surface portion.

3. The system of claim 2, wherein the second portion of the mounting bracket comprises a second curved surface portion.

4. The system of claim 3, wherein a lower portion of the threaded knob abuts the first curved surface portion, and an upper portion of the threaded knob extends past the second curved surface portion, when rotational torque is applied to the threaded knob.

5. The system of claim 1, wherein the hanger bolt is configured to pass through the first and second slots of the mounting bracket at non-transverse angles with respect to the flat mounting feet portions.

6. The system of claim 1, wherein the threaded knob includes a hand grip and at least one push nut.

7. The system of claim 1, wherein the PV module coupling device comprises a rock-it connector.

8. The system of claim 1, wherein the PV module coupling device comprises a clamping connector.

9. The system of claim 1, wherein at least one rib connects the first and second portions of the mounting bracket.

10. A photovoltaic (PV) module mounting system comprising:
    a mounting bracket comprising a curved mating surface extending as an arch between a pair of flat mounting feet portions, the mounting bracket configured to hold a PV module coupling device;
    a hanger bolt comprising a first threaded portion adapted to engage a roof surface, a second threaded portion adapted to pass through the curved mating surface of the mounting bracket; and
    a threaded knob adapted to mate with the second threaded portion of the hanger bolt,
    wherein the curved mating surface comprises an elongated slot that the second portion of the hanger bolt passes through.

11. The system of claim 10, wherein the hanger bolt is configured to pass through the mounting bracket at non-transverse angles with respect to the flat mounting feet portions.

12. The system of claim 10, wherein the knob comprises a grip portion for tightening the knob by hand and at least one push nut.

13. The system of claim 10, wherein the threaded knob compresses the curved mating surface against a roof surface when rotational torque is applied to the threaded knob.

14. The system of claim 10, wherein mounting bracket comprises a flat upper portion positioned above the curved mating surface.

15. The system of claim 10, wherein at least one rib connects the first and second arches of the mounting bracket.

16. A photovoltaic (PV) module mounting system comprising:
    a mounting bracket comprising an elongated and curved mating surface, the mounting bracket configured to hold a PV module coupling device;
    a hanger bolt adapted at a first threaded end to engage a roof surface; and
    a threaded knob adapted to mate with a second threaded end of the hanger bolt while pressing against the mating surface, wherein the curved mating surface is shaped to compensate for angular misalignment of the hanger bolt with respect to the mounting bracket, wherein the mounting bracket comprises a first arch that defines the mating surface, wherein the mounting bracket comprises a second arch disposed above the first arch.

17. The system of claim 16, wherein the hanger bolt can be aligned with the flat mounting feet portions at angles ranging from 80 to 100 degrees.

18. The system of claim 17, wherein the knob comprises an engagement surface configured to at least partially engage with the mating surface when the hanger bolt aligned with the mounting feet portions at any angle in the range.

19. The system of claim 16, wherein the threaded knob is adapted to mate with the hanger bolt by applying rotational torque without requiring tools.

20. The system of claim 16, wherein the hanger bolt includes a washer located between the first threaded end and the second threaded end for limiting a depth that the first threaded portion can achieve in the roof surface.

\* \* \* \* \*